US008960679B2

(12) United States Patent
Ollila et al.

(10) Patent No.: US 8,960,679 B2
(45) Date of Patent: Feb. 24, 2015

(54) SEALING DEVICE

(75) Inventors: Janne Ollila, Espoo (FI); Tom Rönnberg, Espoo (FI)

(73) Assignee: Outotec OYJ, Espoo (FI)

( * ) Notice: Subject to any disclaimer, the term of this patent is extended or adjusted under 35 U.S.C. 154(b) by 617 days.

(21) Appl. No.: 13/387,722

(22) PCT Filed: Aug. 3, 2010

(86) PCT No.: PCT/FI2010/050614
§ 371 (c)(1),
(2), (4) Date: Jan. 27, 2012

(87) PCT Pub. No.: WO2011/015712
PCT Pub. Date: Feb. 10, 2011

(65) Prior Publication Data
US 2012/0126493 A1 May 24, 2012

(30) Foreign Application Priority Data
Aug. 4, 2009 (FI) .................................. 20095823 U

(51) Int. Cl.
*F16J 15/02* (2006.01)
*F16J 15/46* (2006.01)
(Continued)

(52) U.S. Cl.
CPC . *H05B 7/12* (2013.01); *F27D 11/10* (2013.01)
USPC ........... 277/333; 277/534; 277/542; 277/583; 373/95; 373/96; 373/97

(58) Field of Classification Search
USPC ......... 277/333, 510, 511, 534, 542, 578, 583, 277/603, 605, 645, 650; 373/54, 55, 69, 373/94–100, 106
See application file for complete search history.

(56) References Cited

U.S. PATENT DOCUMENTS 3,697,660 A * 10/1972 Frolov et al. .................... 373/95
4,238,634 A * 12/1980 Krogsrud ........................ 373/95
(Continued)

FOREIGN PATENT DOCUMENTS

DE 1540876 A1 5/1970
DE 3704102 C1 10/1988
(Continued)

OTHER PUBLICATIONS

Ari Hirvonen, International Search Report for PCT/FI2010/050614, Jan. 5, 2011.
(Continued)

*Primary Examiner* — Vishal Patel
*Assistant Examiner* — Stacy Warren
(74) *Attorney, Agent, or Firm* — Chernoff, Vilhauer, McClung & Stenzel, LLP

(57) ABSTRACT

In a sealing device (1) for sealing the through hole of an electrode, the pressurizing medium that generates the pressure of mechanical sealings against a rod electrode structure is an inert gas, such as nitrogen. The means for pressing the created sealing ring (6) against the rod electrode structure (4) include a gas distribution chamber (8) surrounding the sealing ring (6); a first channel (9) that is arranged to provide a flow path for the inert gas in between the hose (14) and the gas distribution chamber (8); an annular groove (10) in the sealing surface (7) of the sealing ring (6); and a second channel (11), which is placed in the sealing ring (6) and is arranged to provide a flow path for the gas from the gas distribution chamber to the groove (10) for extruding the gas in between the sealing surface (7) and the rod electrode structure (4).

7 Claims, 1 Drawing Sheet

(51) Int. Cl.
*H05B 7/12* (2006.01)
*F27D 11/10* (2006.01)

(56) References Cited

U.S. PATENT DOCUMENTS

| | | | | | |
|---|---|---|---|---|---|
| 4,269,625 | A | | 5/1981 | Molenaar | |
| 4,457,002 | A | * | 6/1984 | Mathgen et al. ................ | 373/95 |
| 4,587,658 | A | | 5/1986 | Ball | |
| 4,674,101 | A | * | 6/1987 | Matsuo et al. .................. | 373/95 |
| 4,759,032 | A | * | 7/1988 | Willis ............................. | 373/95 |
| 6,018,542 | A | * | 1/2000 | Berger ............................ | 373/95 |

FOREIGN PATENT DOCUMENTS

| | | | |
|---|---|---|---|
| EP | 0581203 | A1 | 2/1994 |
| FI | 81197 | B | 5/1990 |
| SU | 1767708 | A1 | 10/1992 |
| WO | 9848229 | A1 | 10/1998 |

OTHER PUBLICATIONS

Jouko Osara, Finnish Search Report for FI 20095823, Feb. 15, 2010.

* cited by examiner

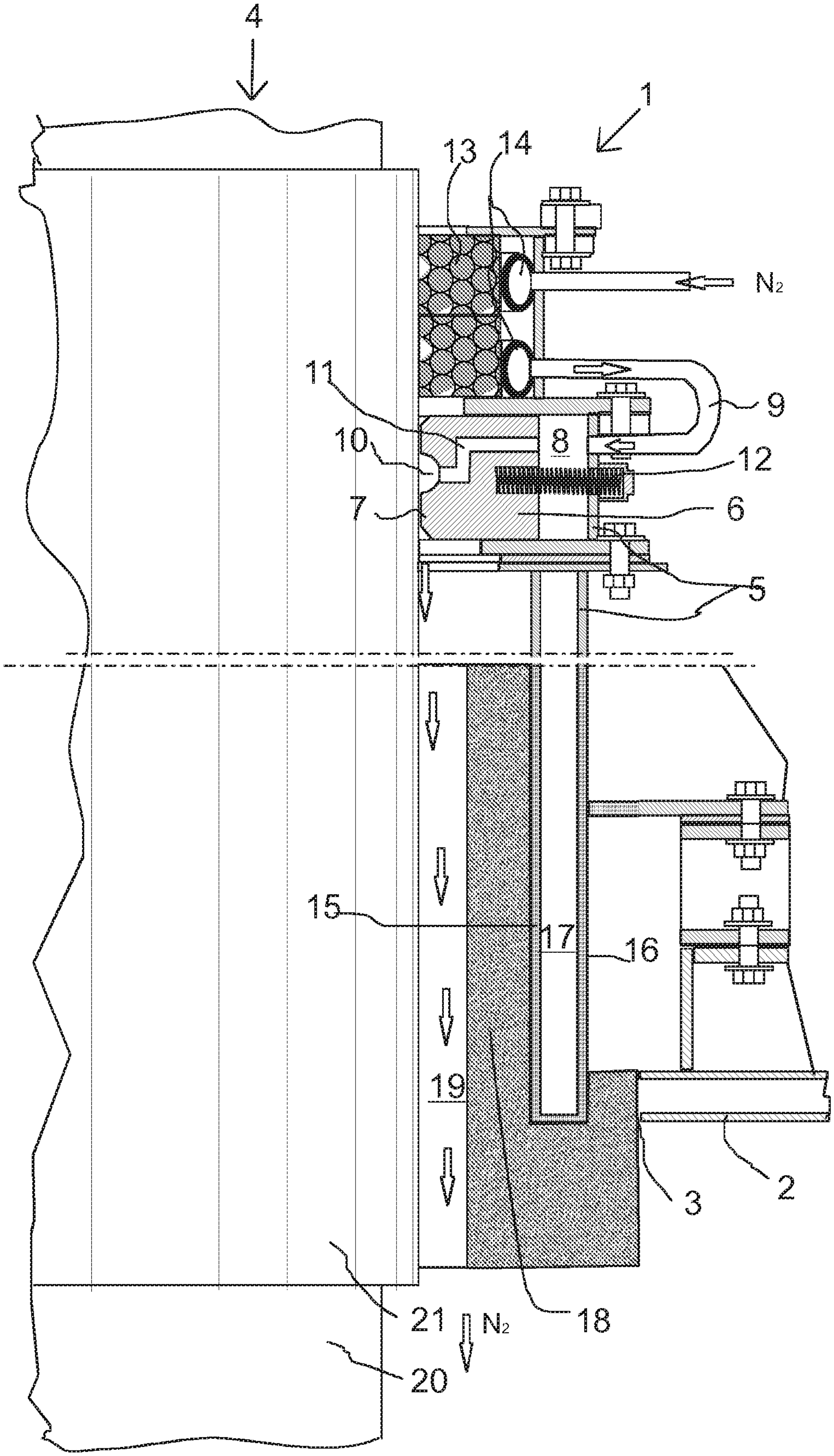
4
1
13
14
N2
9
11
10
8
12
7
6
5
5
15
17
16
19
3
2
21
N2
18
20

SEALING DEVICE

This is a national stage application filed under 35 USC 371 based on International Application No. PCT/FI2010/050614 filed Aug. 3, 2010 and claims priority under 35 USC 119 of Finnish Patent Application No. FI 20095823 filed Aug. 4, 2009.

FIELD OF INVENTION

The invention relates to the sealing of electrodes in electric-arc furnaces used in metallurgy.

BACKGROUND OF INVENTION

An arc furnace is an electrically operated furnace used for melting metal and/or for cleaning slag. The operation of the furnace is based on an electric arc that burns either between separate electrodes, or between electrodes and the material to be melted. The furnace can be operated either by alternating or direct current. Heat is created in the electric arc, and also in the material to be melted, in case the electric arc burns between the material and the electrodes. Power is conducted to vertical electrodes that are located symmetrically in a triangle with respect to the midpoint of the furnace. The assembly depth of the electrodes in the furnace is adjusted from time to time, when they are worn at the tips.

The electrodes extend into the furnace via through holes located in the furnace ceiling. The diameter of a through hole is larger than the diameter of an electrode, in order to ensure free motion of the electrode, and in order to avoid contact between the electrode and the ceiling. The gap left between the electrode and the ceiling aperture must be sealed by a sealing device in order to prevent the access of gases from inside the furnace through the aperture to the atmosphere, and on the other hand in order to prevent the access of air from the atmosphere to the furnace.

In the prior art there are known sealing devices for sealing the gap left between the electrode and the ceiling aperture by mechanical sealings, for instance by graphite rings, graphite rope seals etc. that are hydraulically pressed against the electrode. Various mechanical sealing arrangements are known for example from the publications FI 81197, FI 64458, DE 1540876, and SE 445744. The hydraulic medium used for creating hydraulic compression between the graphite rings and the rope sealings is water.

A drawback with known sealing devices is the use of water as the pressurizing medium in connection with sealing, because in a damage situation, water may accidentally get into the furnace. When water is introduced into the furnace atmosphere with a high temperature, a dangerous water-gas explosion may occur.

OBJECT OF INVENTION

The object of the invention is to eliminate the above mentioned drawbacks.

Another object of the invention is to introduce a sealing device where the use of water is avoided.

SUMMARY OF INVENTION

A sealing device according to the invention includes an annular frame that can be attached to the lid; a sealing ring formed of graphite elements, including a sealing surface and being supported against the frame, to be moved so that the sealing surface can be pressed against the rod electrode structure; means for pressing the sealing ring against the rod electrode structure; a graphite rope sealing, which is arranged above the sealing ring and supported against the frame, to be pressed against the rod electrode structure; a hose that is arranged around the graphite rope sealing, in between the frame and the graphite rope sealing, and can be pressurized by pressurizing medium in order to expand the hose for pressing the graphite rope sealing against the rod electrode structure for creating the compressive force required in the sealing.

According to the invention, the pressurizing medium is an inert gas, such as nitrogen. The means for pressing the sealing ring against the rod electrode structure include an annular gas distribution chamber surrounding the sealing ring; a first channel that is arranged to provide a flow path for the inert gas in between the hose and the gas distribution chamber; an annular groove provided in the sealing surface of the sealing ring; and a second channel that is placed in the sealing ring and arranged to provide a flow path for the gas from the gas distribution chamber to the groove for extruding the gas in between the sealing surface and the rod electrode structure.

An advantage of the invention is that because the employed pressurizing medium is not water but an inert gas, the risk of a water-gas explosion caused by possible leaks is eliminated.

In one embodiment of the sealing device, the means for pressing the sealing ring against the rod electrode structure include a number of compression springs that are arranged to act in between the frame and the sealing ring.

In one embodiment of the sealing device, the frame comprises a metallic double casing structure including an inner casing and an outer casing, which is spaced apart from the inner casing, so that in between the casings, there is formed an annular space for the cooling agent. The employed cooling agent is air. Because water is not used as the cooling agent with the frame, a water-gas explosion cannot occur even if the cooling agent should leak into the furnace.

In one embodiment of the sealing device, the sealing device is provided with a refractory lining, which is arranged in between the frame and the electrode structure. In between the refractory lining and the electrode structure, there is arranged a gap that provides a flow path for the gas to enter the furnace.

In one embodiment of the sealing device, the electrode structure includes an electrode, such as a Söderberg electrode or a graphite electrode, and a protective shield surrounding the electrode.

LIST OF DRAWINGS

The invention is described in more detail below by means of exemplifying embodiments and with reference to the appended drawing, which is a schematical illustration showing a cross-section of one embodiment of a sealing device according to the invention, as installed around an electrode structure.

DETAILED DESCRIPTION OF INVENTION

The drawing shows in a cross-sectional illustration a sealing device 1, which is fitted, via an aperture 3 extending through the lid 2 of the electric arc furnace, around a rod electrode structure 4 that extends vertically to the inside of the furnace and is vertically movable therein, the purpose being to prevent the access of gases from inside the furnace via the aperture to the atmosphere, and on the other hand the access of air from the atmosphere to the furnace. The electrode structure 4 includes an electrode 20, such as a Söderberg electrode or a graphite electrode, and a protective shield 21 surrounding the electrode.

The sealing device 1 has an annular frame 5, which is attached to the lid 2. The frame 5 comprises a metallic double casing structure, including an inner casing 15 and an outer casing 16, which is spaced apart from the inner casing, so that in between the casings, there is created an annular space 17 for the circulation of air that is used as the cooling agent.

A sealing ring 6 made of graphite elements is supported against the frame 5. On the inner periphery of the sealing ring 6, there is provided a sealing surface 7 that can be pressed against the rod electrode structure 4.

Above the sealing ring 6, there is arranged a graphite rope sealing 13, which is supported against the frame in order to be pressed against the rod electrode structure 4. A hose 14 is arranged around the graphite rope sealing 13, in between the frame 5 and the graphite rope sealing 13. The hose 14 can be pressurized by an inert gas, such as nitrogen, used as the pressurizing medium, in order to expand the hose, so that the graphite rope sealing 13 is pressed against the rod electrode structure 4. The pressure of the inert gas is adjusted so that there is obtained a suitable compression force required for the sealing operation.

For pressing the sealing ring 6 against the rod electrode structure 4, there is provided an annular gas distribution chamber 8 surrounding the sealing ring 6. A first channel 9 forms a flow path for the inert gas from the hose 14 to the gas distribution chamber 8, so that the same inert gas that is used for pressing the graphite rope sealing 13 can also be used for pressing the sealing ring 6 against the rod electrode structure 4. The sealing surface 7 of the sealing ring 6 is provided with an annular groove 10. A second channel 11 is provided in the sealing ring 6 and forms a gas flow path from the gas distribution chamber 8 further to the groove 10, so that the gas is discharged in between the sealing surface 7 and the rod electrode structure 4. The sealing device is provided with a refractory lining 18, which is arranged in between the frame 5 and the electrode structure 4. In between the refractory lining 18 and the electrode structure 4, there is provided a gap 19. Inert gas flows in between the sealing surface 7 and the rod electrode structure 4 further down to the interior of the furnace via the flow path provided by the gap 19. Thus inert gas has no access to the atmosphere surrounding the arc furnace.

For pressing the sealing ring 6 against the rod electrode structure 4, it is possible to arrange, in addition to compression by said inert gas, a number of compression springs 12 to act in between the frame 5 and the sealing ring 6.

The invention is not restricted to the above described embodiment only, but many modifications are possible within the scope of the inventive idea defined in the appended claims.

The invention claimed is:

1. A sealing device fitted, via an aperture extending through a lid of an electric arc furnace, around a rod electrode structure that extends to the inside of the furnace and is movable along its axial direction therein to prevent the access of gases from inside the furnace via the aperture to the atmosphere and the access of air from the atmosphere to the furnace, said sealing device including:

an annular frame attached to the lid;

a sealing ring formed of graphite elements and provided with a sealing surface, said sealing ring movably supported against the frame so that the sealing surface is capable of being pressed against the rod electrode structure;

means for pressing the sealing ring against the rod electrode structure;

a graphite rope sealing arranged proximate the sealing ring and the rod electrode structure and supported against the frame; and a hose arranged around the graphite rope sealing between the frame and the graphite rope sealing and capable of being pressurized by a pressurizing medium in order to expand the hose for sealing the graphite rope sealing against the rod electrode structure, wherein the pressurizing medium is an inert gas;

and the means for pressing the sealing ring against the rod electrode structure include:

an annular gas distribution chamber surrounding the sealing ring;

a first channel arranged to provide a flow path for the inert gas in between the hose and the gas distribution chamber;

an annular groove in the sealing surface of the sealing ring, and a second channel placed in the sealing ring and arranged to provide a flow path for the inert gas from the gas distribution chamber to the groove for extruding the inert gas in between the sealing surface and the rod electrode structure.

2. The sealing device according to claim 1, wherein the means for pressing the sealing ring against the rod electrode structure include a plurality of compression springs arranged between the frame and the sealing ring.

3. The sealing device according to claim 1, wherein the frame comprises a metallic double casing structure including an inner casing and an outer casing which is spaced apart from the inner casing, so that in between the casings, there is formed an annular space for air employed as a cooling agent.

4. The sealing device according to claim 1, wherein the sealing device is provided with a refractory lining arranged between the frame and the rod electrode structure; and between the refractory lining and the rod electrode structure is a gap which provides a flow path for the inert gas to the inside of the furnace.

5. The sealing device according to claim 1, wherein the rod electrode structure includes an electrode and a protective shield surrounding the electrode.

6. The sealing device according to claim 5, wherein the electrode is a Soderberg electrode.

7. The sealing device according to claim 5, wherein the electrode is a graphite electrode.

* * * * *